United States Patent [19]
Weibert

[11] Patent Number: 5,860,622
[45] Date of Patent: Jan. 19, 1999

[54] UNIVERSAL AIRCRAFT STEERING BY-PASS PIN

[76] Inventor: Otis A Weibert, 978 N. Linden St., N. Massapequa, N.Y. 11758

[21] Appl. No.: 738,296

[22] Filed: Oct. 25, 1996

[51] Int. Cl.$^6$ ................................................ B64C 25/50
[52] U.S. Cl. ........................................ 244/50; 411/530
[58] Field of Search ..................... 244/50; 285/148.23, 285/148.18; 16/386; 411/513, 514, 530, 490, 487

[56] References Cited

U.S. PATENT DOCUMENTS

| | | |
|---|---|---|
| 1,429,416 | 9/1922 | Fade . |
| 2,530,083 | 11/1950 | Ruch ........................................ 411/530 |
| 4,573,239 | 3/1986 | Valenti et al. . |
| 4,979,263 | 12/1990 | Tölle . |
| 5,577,295 | 11/1996 | Papke et al. ............................. 16/386 |

Primary Examiner—Charles T. Jordan
Assistant Examiner—Tien Dinh
Attorney, Agent, or Firm—Michael I. Kroll

[57] ABSTRACT

A universal aircraft steering by-pass pin (24) comprising a tridimensional shaft (26) that can be installed into various nose gears (28) of different types of aircraft (30), to remove the steering capability of a pilot during a push-out procedure, when a tow bar (32) of a tow vehicle (34) is connected to the nose gear (28) of the aircraft (30). The aircraft (30) can be safely towed to a position where the pilot can start the engines and steer the aircraft to an appropriate runway (36) for takeoff after the tridimensional shaft (26) and tow bar (32) are removed from the nose gear (28).

15 Claims, 7 Drawing Sheets

(PILOT DOES NOT HAVE STEERING CONTROL)

FIG 1A
(PRIOR ART)
(DC 10, MD 11)

FIG 1B
(PRIOR ART)
(A300 AIRBUS)

FIG 1C
(PRIOR ART)
(BOING 757, 767)

UNIVERSAL AIRCRAFT STEERING BY-PASS PIN

BACKGROUND OF THE INVENTION

1. Field of the Invention

The instant invention relates generally to hand held tools and more specifically it relates to a universal aircraft steering by-pass pin.

2. Description of the Prior Art

In the commercial airline industry, one of the supplied pieces of equipment, with the purchase of every aircraft is a pin which when inserted into its prescribed receptacle disables the steering mechanism from being engaged in the cockpit. The pin is a safety feature designed to keep the ground personnel from being tossed around like a rag doll should the pilot inadvertently turn the nose gear while the tow bar is attached to the aircraft.

Boeing, McDonald Douglass, Lockheed and the European manufacturers have each designed their own mechanisms to accomplish the task of disabling the nose gear, whether the methodology is to pull a lever, rotate a handle, or twist a knob. The commonality in these systems is the use of a pin to be inserted before the tow vehicle pushes the aircraft away from the gate and the removal of the pin to enable cockpit steering.

Each airline at every airport maintains a ground crew which is responsible for preparing the aircraft for its next scheduled flight. In airports where the proximity of one parked aircraft to another prevents maneuverability, or to engage the aircraft engines would endanger people or the structures surrounding the aircraft, a tow vehicle is used to remove the aircraft to a position where the pilot can start the engines and steer the aircraft to the appropriate runway.

The towing process is initiated by an airline ground crew employee who arrives at the aircraft with an inventory of pins and a tow bar. After insertion of the pin, the tow bar is attached and with the arrival of the push-out vehicle the aircraft is removed from the gate to a predetermined position, where the tow vehicle and tow bar are disengaged from the nose gear. The pin is removed and the captain is given the authority over the aircraft.

Each airline manufacture has designed its own pin for each type of aircraft, which can be of varying lengths and thicknesses, such as for Boeing 720, 720b, 707, 727, 737, 747, 757 and 767. These types of aircraft span several decades and necessitate change in design. Although these changes are welcomed within the airline industry, it creates a cumbersome system where aircraft ground crew vehicles are required to carry around a dozen or so differing pins, but also may be carrying a number of the same pin for the more popular aircraft arriving at that airport.

Further complications arise as more countries are developing their own aircraft industries and vying for their place in a world marketplace. In the case of the French Airbus A-300, the pin is only a couple of inches long, which makes it difficult to keep track of, especially amongst all the other pins. If the location ribbon is lost the size of the pin makes it hard to locate.

Numerous hand held tools have been provided in prior art. For example, U.S. Pat. No. 2,475,936 to Allen; U.S. Pat. No. 4,799,832 to Abbott; U.S. Pat. No. 4,926,721 to Hsiao and U.S. Pat. No. 5,461,950 to Iwinski all are illustrative of such prior art. While these units may be suitable for the particular purpose to which they address, they would not be as suitable for the purposes of the present invention as heretofore described.

ALLEN, JOHN L.

TACK DRIVING TOOL

U.S. Pat. No. 2,475,936

In a tack driver the combination of a casing, a plunger in the casing, a magnetic tip on the end of the plunger and a spring in the plunger tending to force the magnetic tip outwardly. The casing has an opening in its rear end through which the plunger reciprocates. The plunger is provided with a sear portion engageable with the casing at the opening. Lateral movement of the plunger in the opening engages the sear at the edge of the opening.

ABBOTT, NEIL M.

RATCHET TAP WRENCH

U.S. Pat. No. 4,799,832

A compact tap wrench includes a ring-base, a pair of diametrically opposed handles, and a chuck mechanism friction-fit into the ring-base. A ratchet mechanism is built into one of the handles. The chuck mechanism includes interchangeable jaws for accommodating different ranges of tap sizes.

HSIAO, K. H.

MULTIPURPOSE HAND TOOL STRUCTURE

U.S. Pat. No. 4,926,721

A concealed and built-up type multipurpose hand tool structure which includes a hollow and T-shaped handle for storing a variety of sockets, having middle through-holes to receive therein a variety of hexagonal wrenches or driver heads or other cylindrical tool parts.

IWINSKI, DEAN J.

T-SHAPED REVERSIBLE RATCHET TOOL

U.S. Pat. No. 5,461,950

A generally T-shaped ratchet tool includes an oblong handle containing ratchet mechanism and a shaft engageable with the ratchet mechanism and extending axially therefrom transversely of the handle for coupling to a driven member. The handle housing is formed of two identical plastic halves ultrasonically welded together for cooperation to define therein a cavity formation in which is disposed a ratchet wheel and a pawl, with the ratchet wheel being rotatable relative to the housing in only one direction about an axis. In a first embodiment a shaft is matingly engaged in a passage through the ratchet wheel and is retained therein for axial movement between first and second use positions, respectively projecting through openings at opposite sides of the housing. Detent means holds the shaft in each of its use positions and retains the shaft in engagement with the driven member. In a second embodiment a removable shaft has an engagement portion engageable in the passage of the ratchet wheel from either side of the housing, being held in place by detent structure. The ratchet wheel passage and mating shaft may be either square or hexagonal in transverse cross section, and the shaft may comprise a square driver or may define a bit-receiving socket.

SUMMARY OF THE INVENTION

A primary object of the present invention is to provide a universal aircraft steering by-pass pin that will overcome the shortcomings of the prior art devices.

Another object is to provide a universal aircraft steering by-pass pin that is a single tool, which can fit many different types of aircraft to remove the steering capability of the pilot during a push-out procedure.

An additional object is to provide a universal aircraft steering by-pass pin that will help eliminate the need for companies to purchase different types of pins for each aircraft type, thus decrease company spending, cut inventories and increase company savings.

A further object is to provide a universal aircraft steering by-pass pin that is simple and easy to use.

A still further object is to provide a universal aircraft steering by-pass pin that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1A:
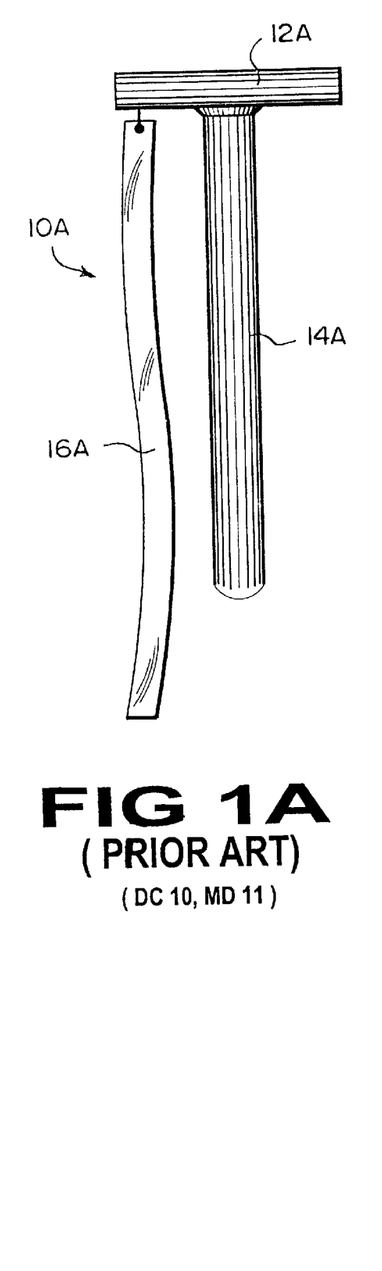
FIG. 1 is an elevational view of a first prior art pin for a DC10 or MD11 aircraft.
Figure 1B:
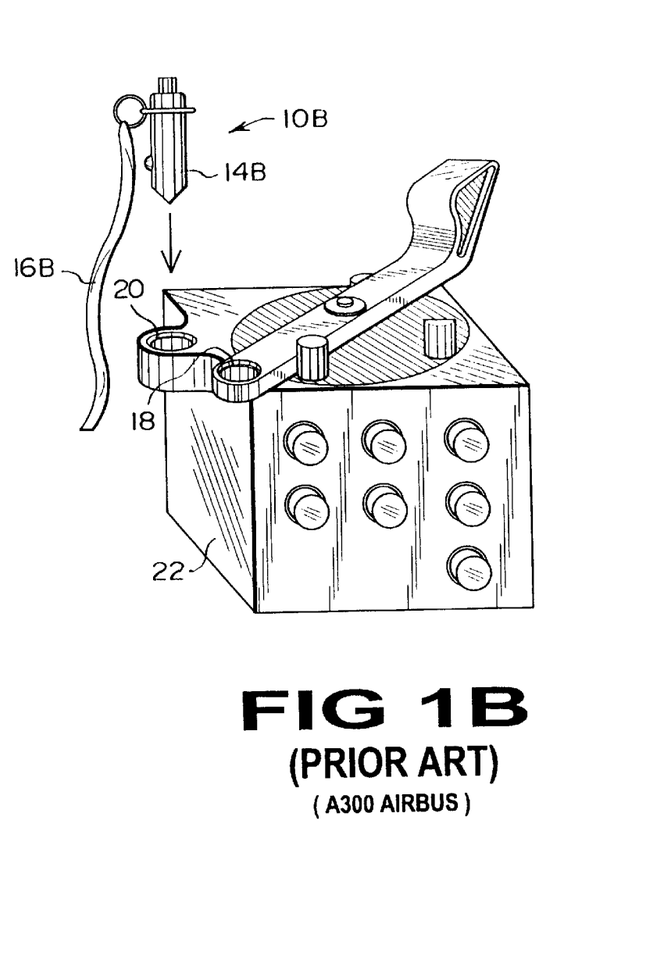
FIG. 1B is a perspective view of a second prior art pin ready to be inserted into the control mechanism of a French Airbus A300.
Figure 1C:
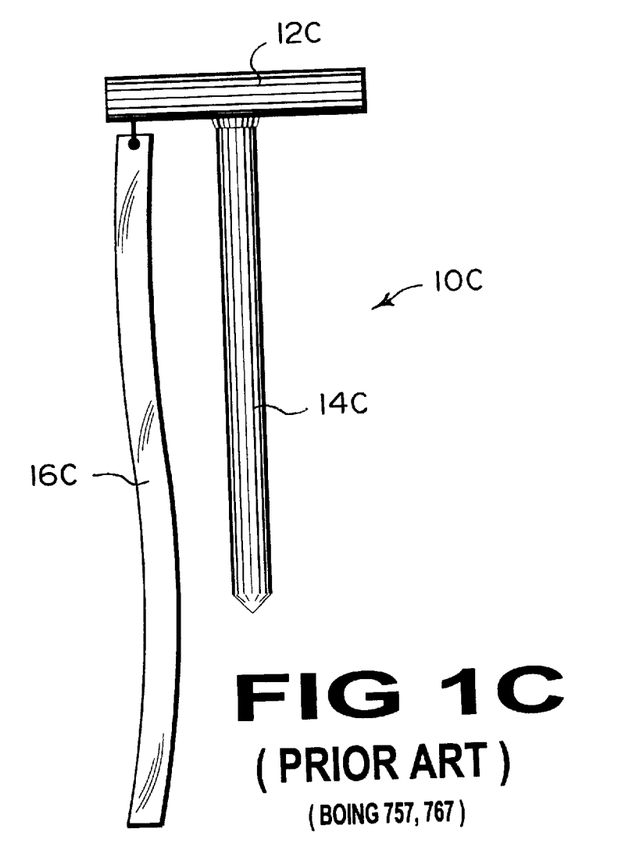
FIG. 1C is an elevational view of a third prior art pin for a Boing 757 or 767 aircraft.

Turning now descriptively to the drawings, in which similar reference characters denote similar elements throughout the several views, FIGS. 1A to 1C illustrate three different prior art pins 10A, 10B and 10C, that are used to disable steering mechanism in nose gears from being engaged by pilots in different types of aircraft.

FIG. 1A shows the first prior art pin 10A having a T-handle 12A connected to a shaft 14A and a location ribbon 16A. The first prior art pin 10A is used only for a DC or MD11 type aircraft. FIG. 1B shows the second prior art pin having a shaft 14B and a location ribbon 16B. The second or art pin 10B is only for and ready to be inserted into respective apertures 18 and 20 of a steering by-pass system in a nose gear of a French Airbus A300 aircraft. FIG. 1C shows the third prior art pin 10C having a T-handle 12C connected to a shaft 14C and a location ribbon 16C. The third prior art pin 10C is used only for a Boeing 757 or 767 type aircraft.

FIGS. 2 through 5 illustrate the instant invention being a universal aircraft steering by-pass pin 24 comprising a tridimensional shaft 26 that can be installed into various nose gears 28 of different types of aircraft 30, to remove the steering capability of a pilot during a push-out procedure, when a tow bar 32 of a tow vehicle 34 is connected to the nose gear 28 of the aircraft 30. The aircraft 30 can be safely towed to a position where the pilot can start the engines and steer the aircraft 30 to an appropriate runway 36 for takeoff after the tridimensional shaft 26 and tow bar 32 are removed from the nose gear 28.

Figure 5:
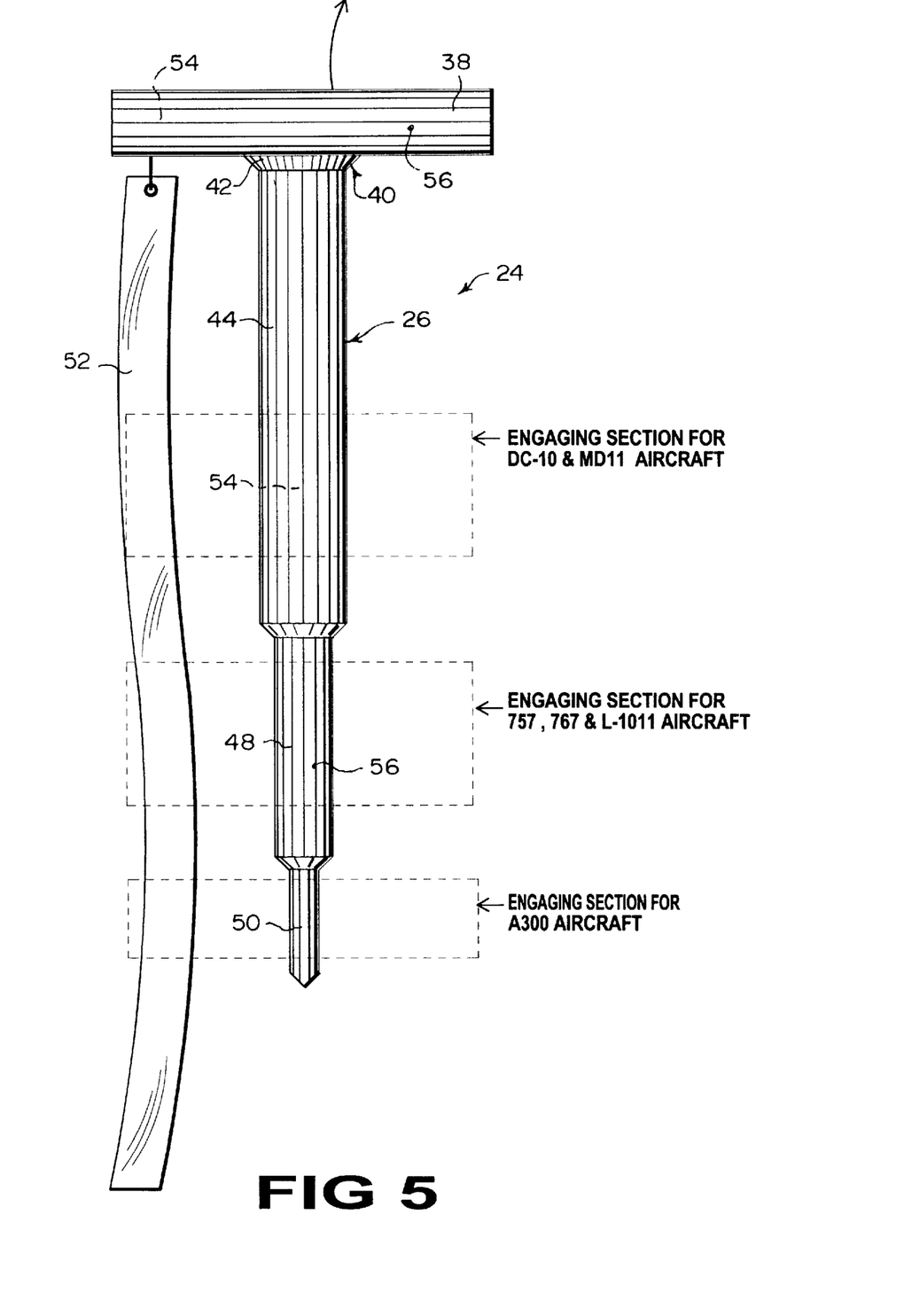
FIG. 5 is an elevational view of the instant invention per se, identifying the different engaging parts for the various aircraft.

The universal aircraft steering by-pass pin 24 further includes a T-handle 38. A component 40 is for attaching the T-handle 38 to a top end of the tridimensional shaft 26, so that a person can grip the T-handle 38 to manipulate the tridimensional shaft 26. The attaching component 40 is a weld 42 formed between the T-handle 38 and the top end of the tridimensional shaft 26.

Figure 3:
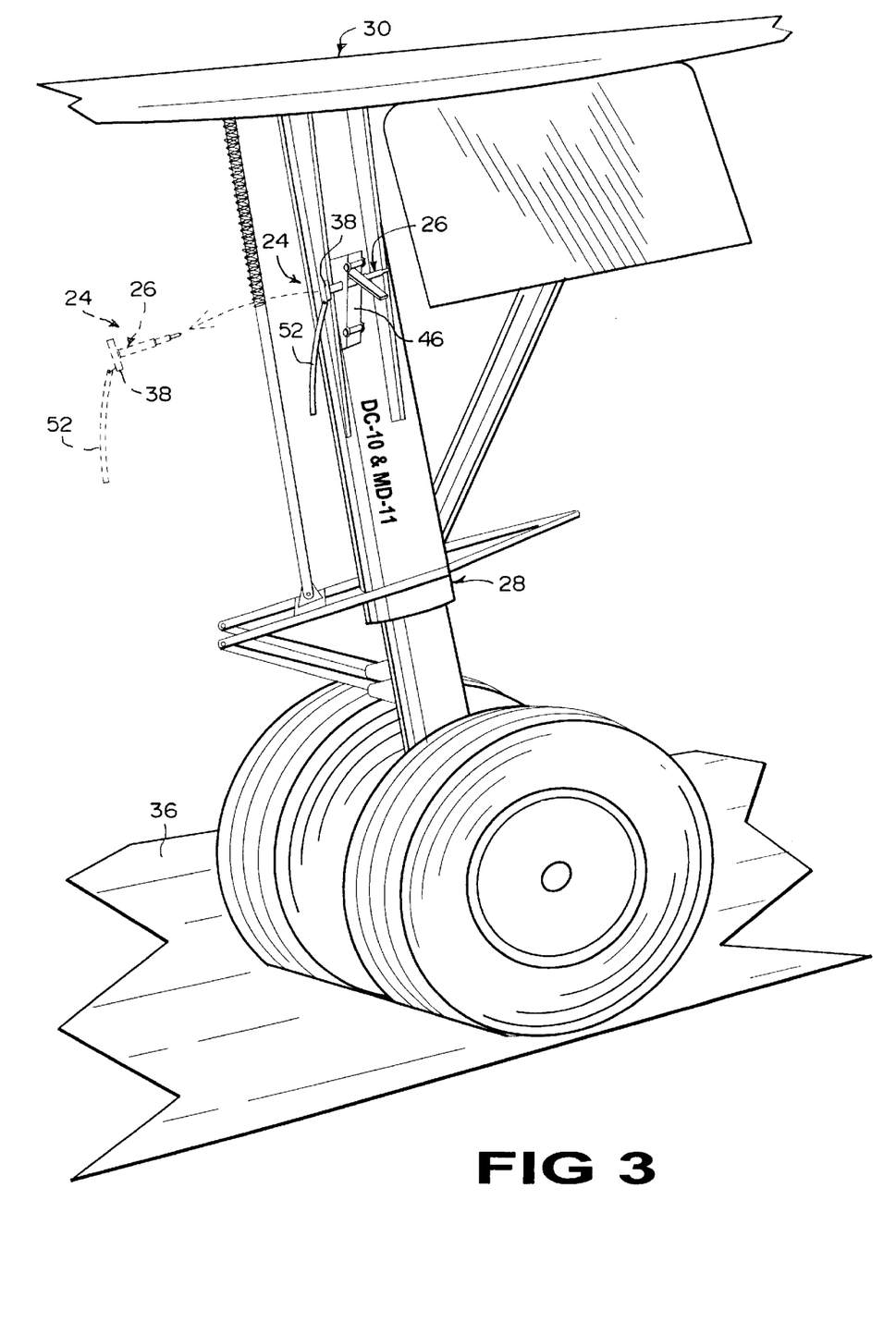
FIG. 3 is an enlarged perspective view of the nose gear as indicated by arrow 3 in FIG. 2, with the instant invention installed in place.
Figure 4:
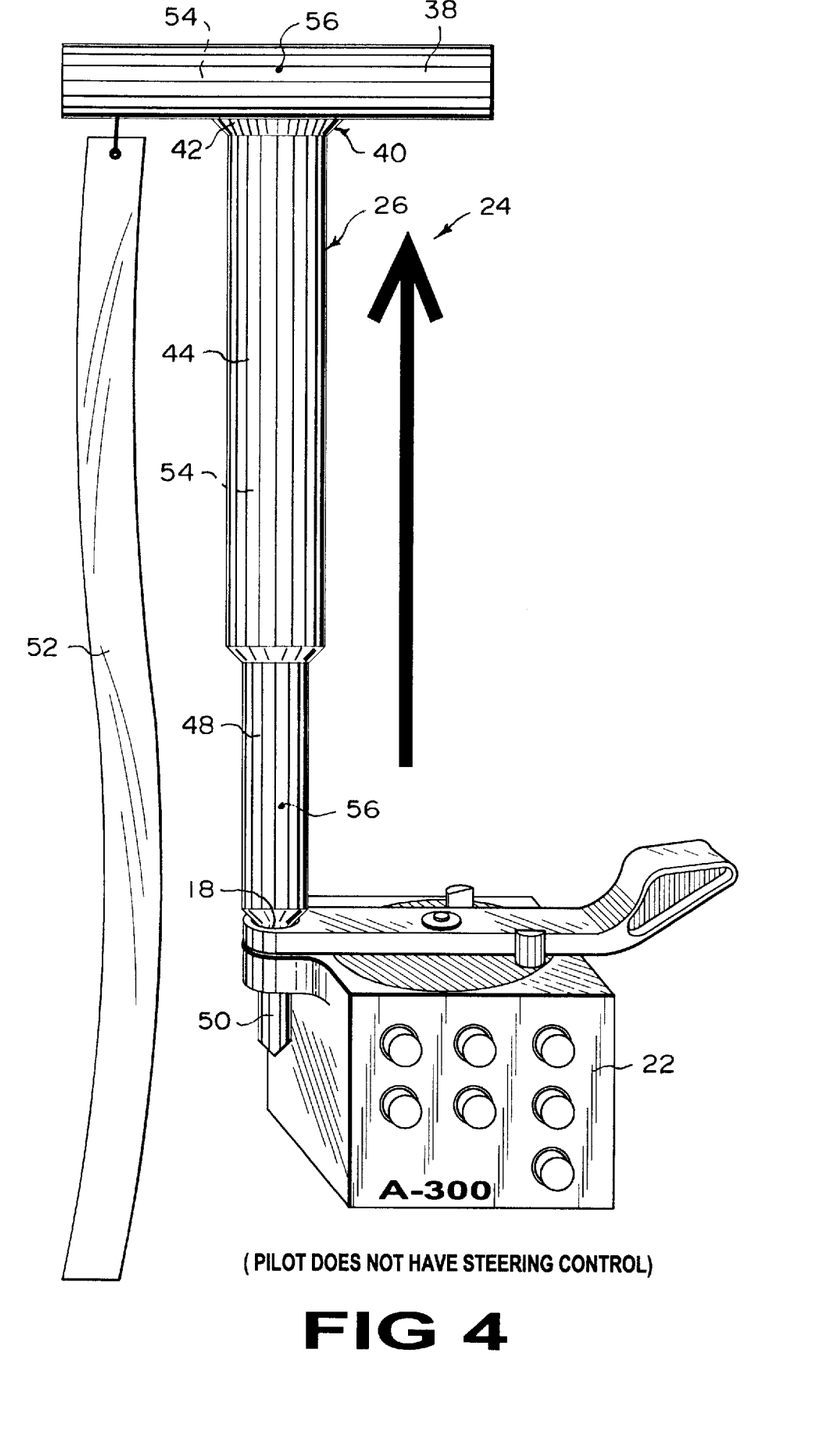
FIG. 4 is a perspective view showing the instant invention installed into the control mechanism of the French Airbus A300.
Figure 4A:
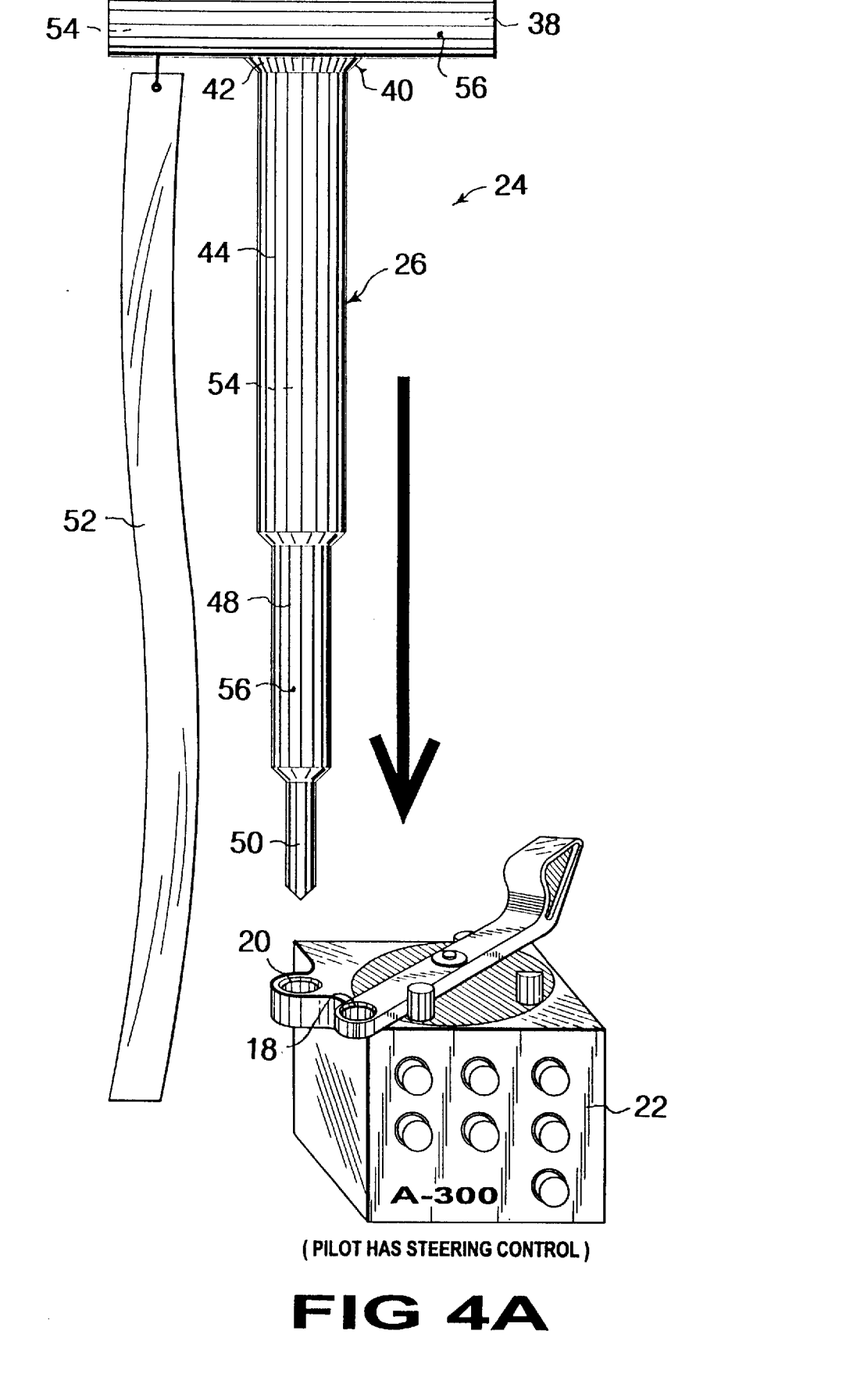
FIG. 4A is a perspective view similar to FIG. 4, showing the instant invention ready to be installed into the control mechanism of the French Airbus A300.

The tridimensional shaft 26 consists of an upper segment 44 sized to be installed into a steering by-pass system 46 in the nose gear 28 of the DC10 MD11 type aircraft 30, as shown in FIG. 3. A middle segment 48 is sized to be installed into the steering by-pass system in the nose gear of a Boeing 757, 767 and L-1011 type aircraft (not shown). A lower segment 50 is sized to be installed into the steering by-pass system 22 in a nose gear of a French Airbus A300 type aircraft, as shown in FIGS. 4 and 4A. The universal aircraft steering by-pass pin 24, further contains an elongate location ribbon 52 affixed at one end to the T-handle for easy location thereof.

The upper segment 44 of the tridimensional shaft 26 is typically, but not limited to be sized at approximately 0.397 of an inch in diameter and four inches in length. The middle segment 48 of the tridimensional shaft 26 is typically, but not limited to be sized at approximately 0.310 of an inch in diameter and two inches in length. The lower segment 50 of the tridimensional shaft 26 is typically, but not limited to be sized at approximately 0.248 of an inch in diameter and one inch in length.

The tridimensional shaft 26 and the T-handle 38 are both fabricated out of a high strength steel 54. The high strength steel 54 is coated with a black oxide 56.

OPERATION OF THE INVENTION

To use the universal steering by-pass pin 24 the following steps should be taken:

1. Grasp the T-handle 38 by the hand to insert the upper segment 44 of the tridimensional shaft 26 into the steering by-pass system 46 in the nose gear 28 of the DC10 or MD11 type aircraft 30, insert the middle segment 48 into the steering by-pass system in the nose gear of a Boeing 757, 767 or L-1011 type aircraft, or insert the lower segment 50 into the respective apertures 18 and 20 of the steering by-pass system 22 in the nose gear of a French Airbus A300 type aircraft.

Figure 2:
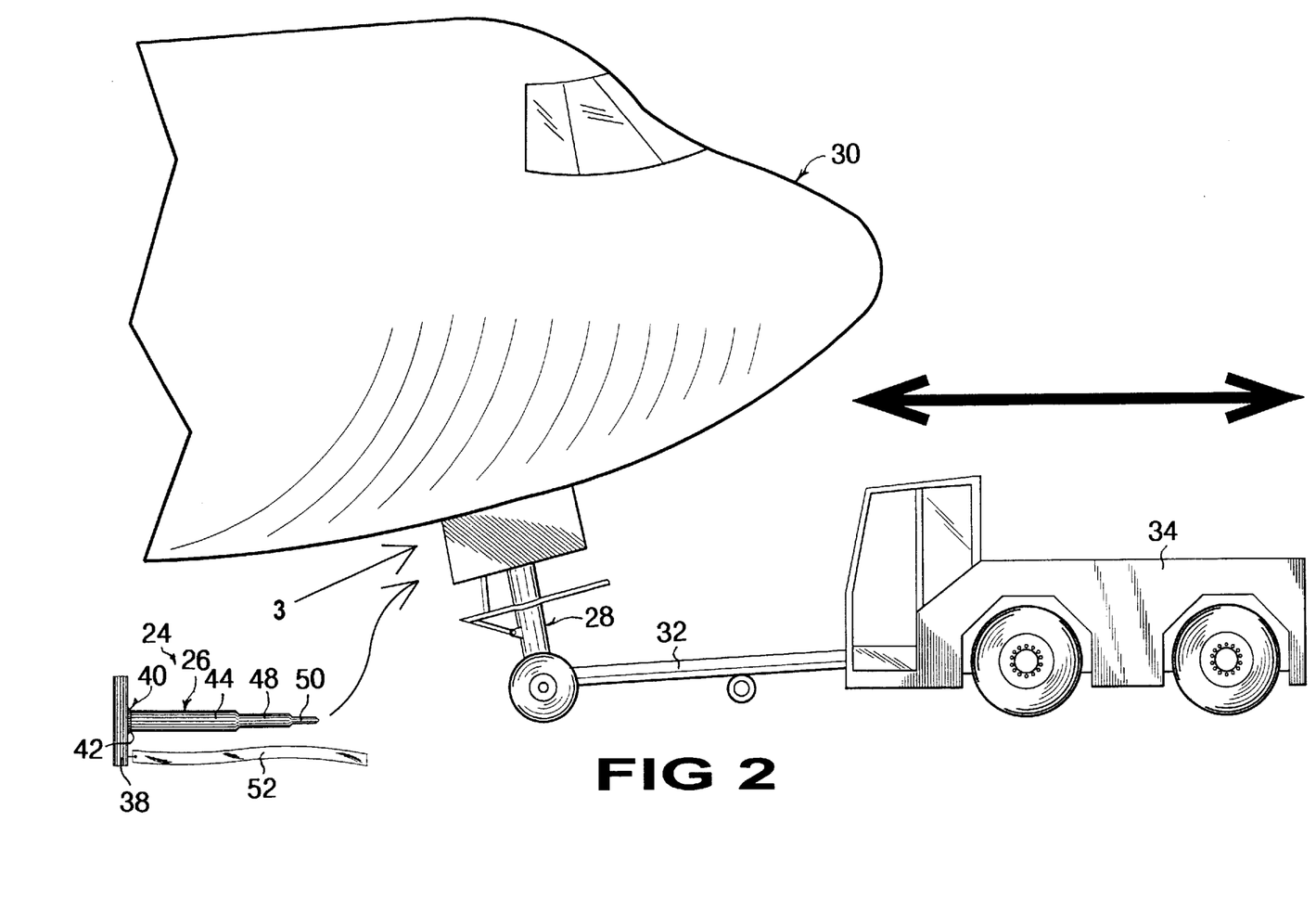
FIG. 2 is a side view of a forward portion of the DC10 or MD11 aircraft, with the tow bar of a push-out vehicle attached to the nose gear and the instant invention ready to be installed thereto.

2. Connect the tow bar 32 of the tow vehicle to the nose gear 28 of the aircraft.
3. Tow the aircraft to a position where the pilot can start the engines and steer the aircraft to an appropriate runway 36 for takeoff.
4. Remove the upper segment 44, middle segment 48 or lower segment 50, of the tridimensional shaft 26 and the tow bar 32 from the nose gear, to allow for the aircraft to takeoff on the runway 36.

LIST OF REFERENCE NUMBERS

10A first prior art pin
10B second prior art pin
10C third prior art pin
12A T-handle of 10A
12C T-handle of 10C
14A shaft of 10A
14B shaft of 10B
14C shaft of 10C
16A location ribbon of 10A
16B location ribbon of 10B
16C location ribbon of 10C
18 aperture in 22
20 aperture in 22
22 steering by-pass system
24 universal aircraft steering by-pass pin
26 tridimensional shaft of 24
28 nose gear on 30
30 aircraft
32 tow bar on 34
34 tow vehicle
36 runway
38 T-handle of 24
40 attaching component of 24
42 weld for 40
44 upper segment of 26
46 steering by-pass system in 28
48 middle segment of 26
50 lower segment of 26
52 location ribbon of 24
54 high strength steel for 26 and 38
56 black oxide coating on 54

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A universal aircraft steering by-pass pin comprising a tridimensional shaft that can be installed into various nose gears of different types of aircraft, to remove the steering capability of a pilot during a push-out procedure, when a tow bar of a tow vehicle is connected to the nose gear of the aircraft, so that the aircraft can be safely towed to a position where the pilot can start the engines and steer the aircraft to an appropriate runway for take off after said tridimensional shaft and tow bar are removed from the nose gear, wherein said tridimensional shaft includes:

a) an upper segment sized to be installed into a steering by-pass system in a nose gear of a DC10 and MD11 type aircraft;

b) a middle segment sized to be installed into a steering by-pass system in a nose gear of a Boeing 757, 767 and L-1011 type aircraft; and c) a lower segment sized to be installed into a steering by-pass system in a nose gear of a French Airbus A300 type aircraft.

2. A universal aircraft steering by-pass pin as recited in claim 1, further including:

a) a T-handle; and b) means for attaching said T-handle to a top end of said tridimensional shaft, so that a person can grip said T-handle to manipulate said tridimensional shaft.

3. A universal aircraft steering by-pass pin as recited in claim 2, wherein said attaching means is a weld formed between said T-handle and the top end of said tridimensional shaft.

4. A universal aircraft steering by-pass pin as recited in claim 3, further including an elongate location ribbon affixed at one end to said T-handle for easy location thereof.

5. A universal aircraft steering by-pass pin as recited in claim 4, wherein said upper segment of said tridimensional shaft is typically, but not limited to be sized at approximately 0.397 of an inch in diameter and four inches in length.

6. A universal aircraft steering by-pass pin as recited in claim 5, wherein said middle segment of said tridimensional shaft is typically, but not limited to be sized at approximately 0.310 of an inch in diameter and two inches in length.

7. A universal aircraft steering by-pass pin as recited in claim 6, wherein said lower segment of said tridimensional shaft is typically, but not limited to be sized at approximately 0.248 of an inch in diameter and one inch in length.

8. A universal aircraft steering by-pass pin as recited in claim 7, wherein said tridimensional shaft and said T-handle are both fabricated out of a high strength steel.

9. A universal aircraft steering by-pass pin as recited in claim 8, wherein said high strength steel is coated with a black oxide.

10. A universal aircraft steering by-pass pin as recited in claim 2, further including an elongate location ribbon affixed at one end to said T-handle for easy location thereof.

11. A universal aircraft steering by-pass pin as recited in claim 2, wherein said tridimensional shaft and said T-handle are both fabricated out of a high strength steel.

12. A universal aircraft steering by-pass pin as recited in claim 11, wherein said high strength steel is coated with a black oxide.

13. A universal aircraft steering by-pass pin as recited in claim 1, wherein said upper segment of said tridimensional shaft is typically, but not limited to be sized at approximately 0.397 of an inch in diameter and four inches in length.

14. A universal aircraft steering by-pass pin as recited in claim 1, wherein said middle segment of said tridimensional shaft is typically, but not limited to be sized at approximately 0.310 of an inch in diameter and two inches in length.

15. A universal aircraft steering by-pass pin as recited in claim 1, wherein said lower segment of said tridimensional shaft is typically, but not limited to be sized at approximately 0.248 of an inch in diameter and one inch in length.

* * * * *